Patented Aug. 20, 1929.

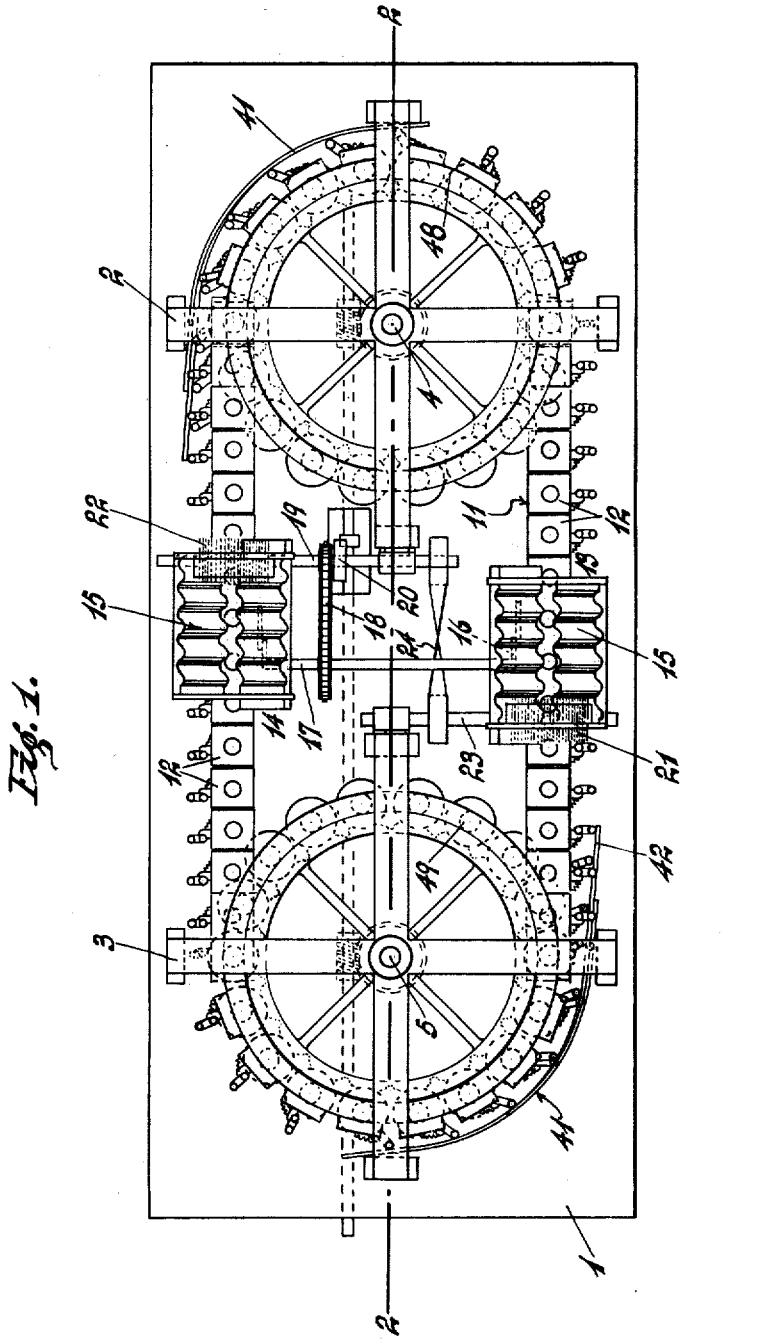

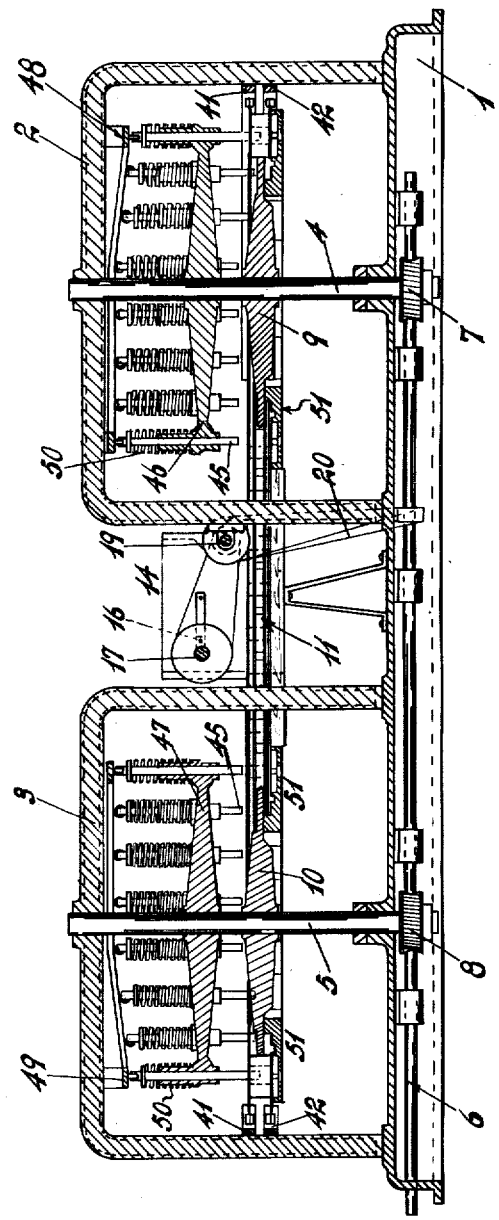

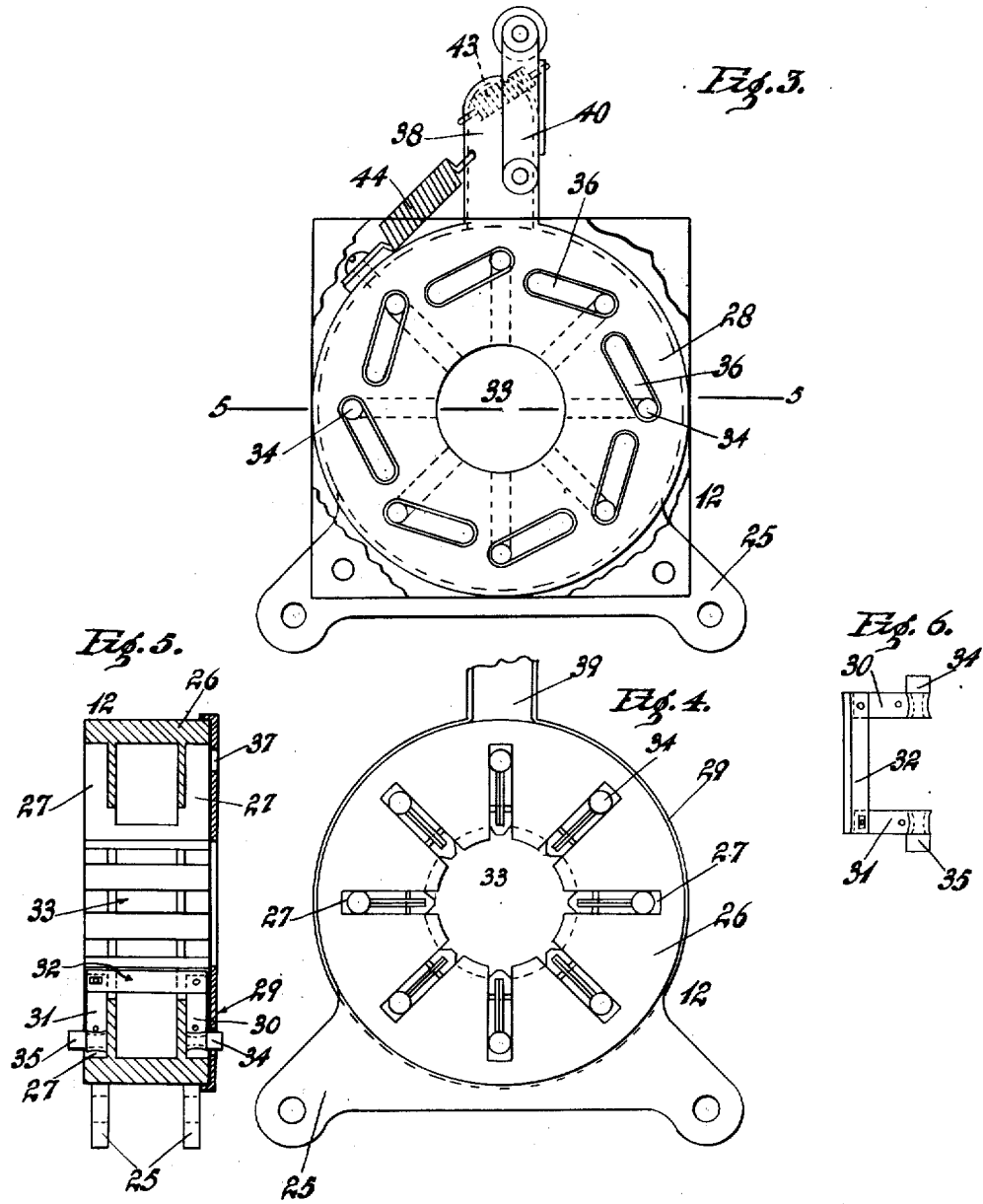

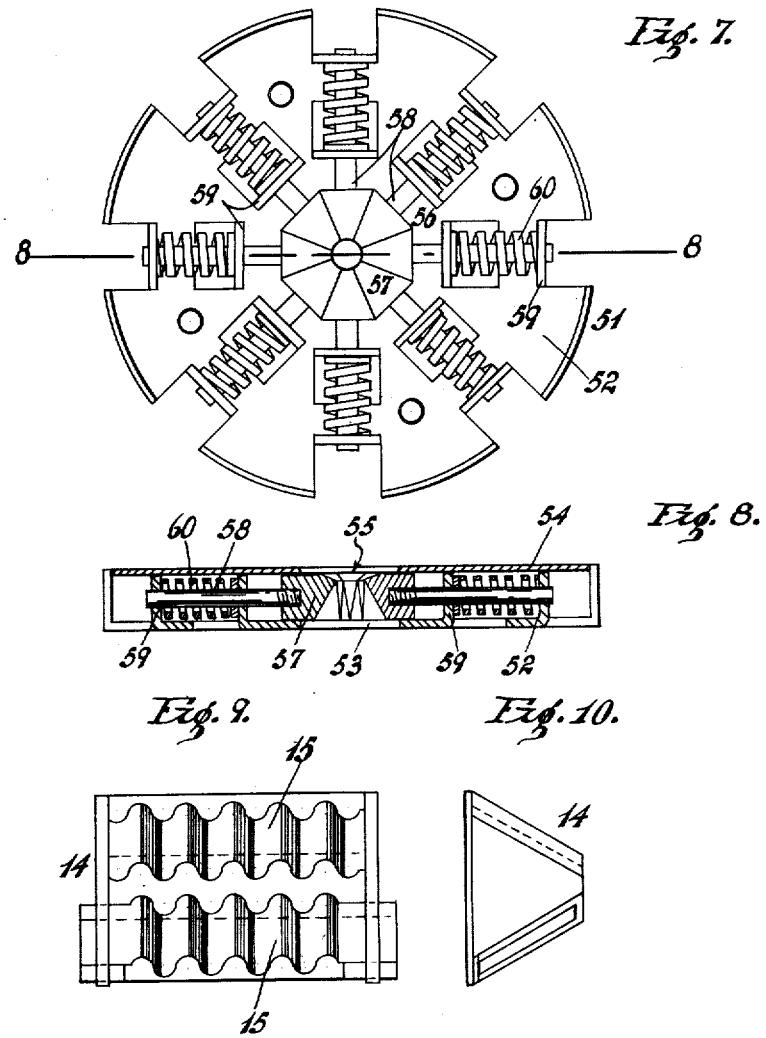

1,725,223

UNITED STATES PATENT OFFICE.

JOHN EDWIN STURGES, OF OAKLAND, CALIFORNIA, ASSIGNOR TO ROSENBERG BROS. & CO., OF SAN FRANCISCO, CALIFORNIA, A CORPORATION OF CALIFORNIA.

FRUIT PITTER.

Application filed November 8, 1924. Serial No. 748,555.

My invention is an improved fruit pitting machine.

The object of my invention is to provide a machine, which will quickly and accurately position the fruit over a yieldable opening, and then depress a member to force the pit through said opening.

Another object is to provide a novel means to hold the fruit with the longitudinal axis of the pit in alignment with the aperture.

Other objects and advantages will be pointed out more specifically in the following detailed description.

In the annexed drawings I have illustrated the preferred form of my invention, but it may also be embodied in other forms, and in this application I desire to cover my invention in whatever form it may be embodied.

Figure 1 is a plan view of my machine.

Figure 2 is a sectional view taken on the line 2—2 of Fig. 1.

Figure 3 is a plan view of a fruit-holding basket.

Figure 4 is a plan view of the same with the cover removed.

Figure 5 is a sectional view taken on the line 5—5 of Fig. 3.

Figure 6 is a side view of one of the basket fingers.

Figure 7 is a plan view of an apertured die with the cover removed.

Figure 8 is a sectional view taken on the line 8—8 of Fig. 7.

Figure 9 is also a plan view of the hopper.

Figure 10 is an end view of the same.

Referring more particularly to the drawings, I disclose therein my machine as comprising a base plate 1 and a pair of frames 2 and 3 positioned on either end thereof. Vertical shafts 4 and 5 are journaled in the base 1 and in the frames 2 and 3 respectively, and are rotated by a shaft 6 through suitable gearing 7 and 8. The shaft 6 is rotated by any suitable source of power (not shown) and is journaled on the base 1. Sprockets 9 and 10 are secured to the shafts 4 and 5 respectively, and a conveyer 11 extends around them, said conveyer being formed of a plurality of fruit-holding baskets 12. Hoppers 13 and 14 are positioned over each reach of the conveyer 11 to distribute fruit thereon. These hoppers are substantially V shaped troughs, the inner surfaces of which are corrugated as shown at 15. The corruga-tions impede the free movement of the fruit within the hopper, caused by the movement of the conveyer. Thus the fruit is more evenly distributed within the hopper and assures each basket a load as it travels thereunder. One wall of the hoppers 13 and 14 is stationary while the other wall is caused to reciprocate in the direction of movement of the conveyer 11, this movement being accomplished by cranks 16—16 mounted on the ends of a shaft 17. This shaft is rotated by a chain 18 from a shaft 19 which is in turn rotated by the shaft 6 through a belt 20. Due to the movement of the conveyer under the hopper, the fruit will tend to collect at the end of said hopper, towards which the conveyer is travelling. To prevent this collection, brushes 21 and 22 are provided in the hoppers 13 and 14 respectively, which are mounted on shafts 23 and 19 respectively. The shaft 23 is rotated by a belt 24 from the shaft 19. The direction of rotation of the brushes 21 and 22 is opposite to that of the conveyer 11, thus throwing the fruit back into the hopper.

The baskets 12 which compose the conveyer 11 are linked together by ears 25 formed thereon. The object of these baskets is to receive, centralize, and erect the fruit so that its longitudinal axis is in a vertical position, preparatory to removing the pit therefrom.

Each of these baskets consists of a disc-shaped body portion 26, in the face of which a plurality of radial slots 27 are formed. Control cam plates 28 and 29 are rotatably mounted on the upper and lower faces of the disc 26. Fingers are mounted in the discs 26, which consist of blades 30 and 31, slidably mounted in the top and bottom slots 27—27. These blades are each pivoted to a vertical bar 32 which is positioned in the central opening 33 of the disc 26. Pins 34 and 35 project from the blades 30 and 31 respectively and extend into inclined cam slots 36 and 37 respectively in the plates 28 and 29. Tongues 38 and 39 extend from the plates 28 and 29 respectively, and to each tongue a contact arm 40 is pivoted. These arms are adapted to engage cam rails 41 and 42 which are secured to the frames 2 and 3 and are in horizontal alignment with the upper and lower cam plates 28 and 29 respectively. As the conveyer 11 is rotated, the arms 40 will engage the cam rails 41 and 42, respectively, so as to swing the cam plates 28 and 29, thereby moving the pins 34 and 35 inwardly in the slots 36 and thus carrying the bars 32 inwardly against the fruit. The lower rail 42 is longer than the upper rail 41, and therefore is first to engage the lower arms 40 which move the lower parts of the bars 32 inwardly and constrict the lower part of the opening 33. This centers the lower end of the fruit. The upper part of the bars 32 is now moved inwardly and thereby carries the fruit into an upright position ready for pitting. Due to the various sizes of fruit, the bars 32 cannot close an equal amount at each operation, therefore, the arms 40 actuate the plates 28 and 29 through springs 43 secured to said arms and to the tongues 38 and 39 respectively. Thus, the fruit is not injured through a positive closing action. After the baskets 12 have passed the rails 41 and 42 the fruit is released and the bars 32 are withdrawn by the action of springs 44, respectively secured to the tongues 38 and 39 and to the body 26, thereby returning the plates 28 and 29 to their normal nonoperative position.

The fruit having been positioned with its longitudinal axis vertically, the next operation is to exert pressure on the top thereof and to force the pit out through a die positioned below the baskets 12. This pressure is exerted by a plurality of plungers 45 which are slidably mounted in spiders 46 and 47 secured to the shafts 4 and 5 respectively above the sprockets 9 and 10. The plungers are so arranged that one is positioned over each of the baskets 12 as they travel around the sprockets 9 and 10. These plungers are depressed by engaging cams 48 and 49 secured to the frames 2 and 3 respectively, said depression occurring against the compression of springs 50.

A plurality of dies 51 are secured to the sprockets 9 and 10 in juxtaposition to the baskets 12 as they travel around the said sprockets. These dies consist of a pan 52 which has a central opening 53 in the bottom, and a cover 54 having a central opening 55 therein. A perforated pit scraper 56 is positioned within the die over the opening 53, and consists of a plurality of interlocking segments 57. A rod 58 extends from each of the segments and is guided in upturned lugs 59—59. A spring 60 surrounds each of the rods 58, and urges the segments 57 inwardly against the pit, as it is forced downwardly by the plunger 45 and is removed from the pulp.

The operation of my machine is as follows: the shaft 6 is rotated, and through the gears 7 and 8 the shafts 4 and 5 are rotated and thereby move the conveyer 11. The hoppers 13 and 14 are filled with fruit and feed it through the bottom to the baskets 12, one piece to each basket. The arms 40 on the lower tongues 39 then engage the lower cam rail 42 and constrict the bottom of the opening 33. The upper arms 40 now engage the upper cam rail 41, which carries the fruit into a vertical position by moving the bars 32 inwardly. The plungers 45 are thereafter operated by engaging the cams 48 or 49 and presses are thus caused to press upon the top of the fruit. The cam rails 41 and 42 are slightly relieved at this point to permit the fruit to expand, due to the pressure thereon. The pit is forced out through the bottom of the fruit and through the openings 55 and 53 at the inner ends of the yielding segments 57. As the baskets reach the ends of the cam rails 41 and 42, the springs 44 open the bars 32 and thus allow the pitted fruit to drop through the baskets into a container.

Since the sprocket wheels 9 and 10 are fixed upon the respective vertical shafts 4 and 5, it is obvious that, during the operation of my machine, the conveyer 11 moves continuously in a virtually horizontal plane. Additional operating parts for imparting a vertical movement to the conveyer and for causing the horizontal movement thereof to be intermittent, as has been attempted in the prior art, are thus eliminated by my construction, so that a smooth and easy running of the machine is assured.

Having described my invention, I claim:

1. A fruit-pitting machine comprising a conveyer, means to move the conveyer continuously in a virtually horizontal plane, the conveyer comprising a plurality of fruit-holding baskets, apertured dies under said baskets, and means extending into said baskets to exert pressure on the fruit therein.

2. A fruit-pitting machine comprising a conveyer, means to move the conveyer continuously in a virtually horizontal plane, the conveyer comprising a plurality of fruit-holding baskets, apertured dies under said baskets, means extending into said baskets to exert pressure on the fruit therein, and a hopper over said conveyer to distribute fruit to said baskets.

3. A fruit-pitting machine comprising a conveyer, means to rotate said conveyer, said conveyer comprising a plurality of fruit-holding baskets, apertured dies under said baskets, means extending into said baskets to exert pressure on the fruit therein, a hopper over said conveyer to distribute fruit to said baskets, said hopper comprising a trough, means to reciprocate the sides of said trough, the inner surface of said hopper being corrugated, a brush at one end of said hopper, and means to rotate said brush.

4. A fruit-pitting machine comprising a conveyer, means to rotate said conveyer, said conveyer comprising a plurality of fruit-holding baskets, apertured dies under said baskets, means extending into said baskets to exert pressure on the fruit therein, a plurality of radially positioned blades in said baskets, and means to move said blades inwardly to engage the fruit therein.

5. A fruit-pitting machine comprising a conveyer, means to rotate said conveyer, said conveyer comprising a plurality of fruit-holding baskets, apertured dies under said baskets, means extending into said baskets to exert pressure on the fruit therein, a plurality of radially positioned blades in the upper part of each basket, a plurality of radially positioned blades in the lower part of each basket, and independent means to move said upper and lower blades inwardly to engage the fruit.

6. A fruit-pitting machine comprising a conveyer, means to rotate said conveyer, said conveyer comprising a plurality of fruit-holding baskets, apertured dies under said baskets, means extending into said baskets to exert pressure on the fruit therein, a plurality of radially positioned blades in said baskets, pins extending from said blades, a control plate mounted on each basket, said plate having cam slots formed therein into which said pins extend, and means to rotate said control plates to actuate said blades.

7. A fruit-pitting machine comprising a conveyer, means to rotate said conveyer, said conveyer comprising a plurality of fruit-holding baskets, apertured dies under said baskets, means extending into said baskets to exert pressure on the fruit therein, a plurality of radially positioned blades in the upper part of each basket, pins extending from said blades, an upper control plate mounted on each basket, said plate having cam slots formed therein, said pins extending into said slots, a plurality of radially positioned blades in the lower part of each basket, pins extending from said lower blades, a lower control plate, said lower plate having cam slots formed therein, into which the pins on the lower blades extend, and means to independently actuate said upper and lower control plates.

8. A fruit-pitting machine comprising a pair of sprockets arranged to lie in a horizontal plane, a conveyer extending around said sprockets, means to rotate said sprockets continuously in said plane, a plurality of fruit-holding baskets on said conveyer, apertured dies juxtapositioned to said baskets, and means extending into said baskets to exert pressure thereon to force the pit through said apertured die.

9. A fruit-pitting machine comprising a pair of sprockets, a conveyer extending around said sprockets, means to rotate said sprockets, a plurality of fruit-holding baskets on said conveyer, apertured dies juxtapositioned to said baskets, and means extending into said baskets to exert pressure thereon to force the pit through said apertured die, said die comprising a plurality of inter-engaging segments, and springs in said die urging said segments inwardly.

10. In a fruit-pitting device of the character described, a basket advancing continuously in a virtually horizontal plane, means for dropping a fruit to be pitted thereinto, means associated with the basket automatically adjusting the same to an upright position, and means for forcing an element through the fruit from above for removing the pit therefrom.

11. A fruit-pitting device, as defined in claim 10, in which the automatic adjusting means are made to first center the bottom end of the fruit and to thereafter work toward the top.

12. A fruit-pitting device, as defined in claim 10, in which the automatic adjusting means comprise a plurality of vertical blades surrounding the fruit, and means for advancing first the lower ends and then the upper ends of the blades centerwise.

13. A fruit-pitting device, as defined in claim 10, in which radially disposed retractible elements are arranged below the basket and scrape the pit while the latter is forced therethrough.

14. In a fruit-pitting device of the character described, an endless series of baskets moving in a horizontal plane, means for successively dropping a fruit in each basket, means associated with each basket and actuated by the forward travel thereof for straightening out the fruit therein to cause the same to stand upright, a series of vertically movable plungers advancing in synchronism with the baskets and means actuated by the forward travel of the plungers for causing the latter to descend into the baskets and to force the pits out of the fruits.

15. A fruit-pitting device, as defined in claim 14, in which retractible elements are arranged at the bottom of the baskets for scraping the pit as the same is forced therethrough.

16. In a fruit-pitting device of the character described, a basket comprising a supporting element formed with a central hole allowing the fruit to be accommodated therein, a plurality of radial blades in the wall of the hole, and means for advancing the top and the bottom ends of the blades centerwise independently.

17. A basket, as defined in claim 16, in which the advancing means comprise arms extending rearwardly from the top and bottom ends of the blades, plates mounted revolvably relative to the supporting element, and pins extending from the arms riding in guide slots in the plates.

18. In a fruit-pitting device of the character described, a pit scraper comprising a plurality of radially disposed retractible elements arranged in a transverse relation to the fruit so as to form an expansible circle around the fruit for allowing the fruit pit to be forced therethrough and for simultaneously scraping the meat of the fruit from the pit.

19. A pit scraper, as defined in claim 18, in which the said elements are slightly tapered at their upper faces toward the center so as to form a seat for the meat of the fruit.

20. A pit scraper, as defined in claim 18, in which the said elements are slightly tapered at their upper faces toward the center so as to form a seat for the meat of the fruit and in which the corresponding bottom faces are tapered to present a sharp scraping edge and to assist in pushing the pit out of the device.

21. In a fruit-pitting device of the character described, a plurality of travelling baskets; means for feeding individual fruits thereinto comprising two corrugated sheets arranged to form a trough above the baskets with the corrugations running up and down; and means for reciprocating one of the sheets for shaking fruits lying in the trough into the baskets.

22. In a fruit pitting machine, a basket having independently movable upper and lower portions adapted to receive fruit to be pitted, and means for independently contracting the said upper and lower portions of said basket.

23. In a fruit pitting machine, a basket having independently movable upper and lower portions for receiving fruit, means for moving said basket from a position of reception to a pitting position, and means for independently contracting the said upper and lower portions of said basket.

24. In a prune pitting machine, a basket having an opening for receiving prunes to be pitted, a pitting plunger, a hopper, means for feeding prunes from the hopper and for presenting a prune within the basket with its pit arranged in the general direction of said opening, means for contracting said basket, and means for actuating said plunger after the basket has been contracted.

25. In a fruit pitting machine, a contractable basket adapted to receive individual fruit to be pitted, means for contracting part of said basket upon the sides of the fruit, and for automatically effecting general alining of said fruit with respect to a definite axis before complete contracting movement of said basket has been effected.

26. In a fruit pitting machine, a contractable basket having separably movable upper and lower portions and adapted to receive individual fruit to be pitted, means for contracting said basket upon the sides of said fruit, and means for automatically effecting general alining of said fruit with respect to a definite axis before effecting contracting movement of the upper portion of said basket.

27. In a fruit pitting machine, a basket adapted to receive an individual fruit, feeding means serving to drop individual fruit into the basket, automatic means for effecting general alining of said fruit with respect to a definite axis, means for contracting said basket upon the sides of the fruit, and means for effecting a pitting operation.

28. In a fruit pitting machine, a basket adapted to receive individual fruit, means forming a part of the basket for automatically effecting alining of the fruit with respect to a definite axis, and means for forcing an element thru the fruit for removing the pit therefrom.

In testimony whereof I affix my signature.

J. EDWIN STURGES.

DISCLAIMER 1,725,223.—*John Edwin Sturges*, Oakland, Calif. FRUIT PITTER. Patent dated August 20, 1929. Disclaimer filed June 13, 1933, by the patentee.

Hereby enters this disclaimer to that part of the claims in the specification of said Letters Patent which is in the following words, to-wit:

"18. In a fruit-pitting device of the character described, a pit scraper comprising a plurality of radially disposed retractible elements arranged in a transverse relation to the fruit so as to form an expansible circle around the fruit for allowing the fruit pit to be forced therethrough and for simultaneously scraping the meat of the fruit from the pit.

"19. A pit scraper, as defined in claim 18, in which the said elements are slightly tapered at their upper faces toward the center so as to form a seat for the meat of the fruit.

"20. A pit scraper, as defined in claim 18, in which the said elements are slightly tapered at their upper faces toward the center so as to form a seat for the meat of the fruit and in which the corresponding bottom faces are tapered to present a sharp scraping edge and to assist in pushing the pit out of the device."

[*Official Gazette July 11, 1933.*]

ments arranged in a transverse relation to the fruit so as to form an expansible circle around the fruit for allowing the fruit pit to be forced therethrough and for simultaneously scraping the meat of the fruit from the pit.

19. A pit scraper, as defined in claim 18, in which the said elements are slightly tapered at their upper faces toward the center so as to form a seat for the meat of the fruit.

20. A pit scraper, as defined in claim 18, in which the said elements are slightly tapered at their upper faces toward the center so as to form a seat for the meat of the fruit and in which the corresponding bottom faces are tapered to present a sharp scraping edge and to assist in pushing the pit out of the device.

21. In a fruit-pitting device of the character described, a plurality of travelling baskets; means for feeding individual fruits thereinto comprising two corrugated sheets arranged to form a trough above the baskets with the corrugations running up and down; and means for reciprocating one of the sheets for shaking fruits lying in the trough into the baskets.

22. In a fruit pitting machine, a basket having independently movable upper and lower portions adapted to receive fruit to be pitted, and means for independently contracting the said upper and lower portions of said basket.

23. In a fruit pitting machine, a basket having independently movable upper and lower portions for receiving fruit, means for moving said basket from a position of reception to a pitting position, and means for independently contracting the said upper and lower portions of said basket.

24. In a prune pitting machine, a basket having an opening for receiving prunes to be pitted, a pitting plunger, a hopper, means for feeding prunes from the hopper and for presenting a prune within the basket with its pit arranged in the general direction of said opening, means for contracting said basket, and means for actuating said plunger after the basket has been contracted.

25. In a fruit pitting machine, a contractable basket adapted to receive individual fruit to be pitted, means for contracting part of said basket upon the sides of the fruit, and for automatically effecting general alining of said fruit with respect to a definite axis before complete contracting movement of said basket has been effected.

26. In a fruit pitting machine, a contractable basket having separably movable upper and lower portions and adapted to receive individual fruit to be pitted, means for contracting said basket upon the sides of said fruit, and means for automatically effecting general alining of said fruit with respect to a definite axis before effecting contracting movement of the upper portion of said basket.

27. In a fruit pitting machine, a basket adapted to receive an individual fruit, feeding means serving to drop individual fruit into the basket, automatic means for effecting general alining of said fruit with respect to a definite axis, means for contracting said basket upon the sides of the fruit, and means for effecting a pitting operation.

28. In a fruit pitting machine, a basket adapted to receive individual fruit, means forming a part of the basket for automatically effecting alining of the fruit with respect to a definite axis, and means for forcing an element thru the fruit for removing the pit therefrom.

In testimony whereof I affix my signature.

J. EDWIN STURGES.

DISCLAIMER 1,725,223.—*John Edwin Sturges*, Oakland, Calif. FRUIT PITTER. Patent dated August 20, 1929. Disclaimer filed June 13, 1933, by the patentee.

Hereby enters this disclaimer to that part of the claims in the specification of said Letters Patent which is in the following words, to-wit:

"18. In a fruit-pitting device of the character described, a pit scraper comprising a plurality of radially disposed retractible elements arranged in a transverse relation to the fruit so as to form an expansible circle around the fruit for allowing the fruit pit to be forced therethrough and for simultaneously scraping the meat of the fruit from the pit.

"19. A pit scraper, as defined in claim 18, in which the said elements are slightly tapered at their upper faces toward the center so as to form a seat for the meat of the fruit.

"20. A pit scraper, as defined in claim 18, in which the said elements are slightly tapered at their upper faces toward the center so as to form a seat for the meat of the fruit and in which the corresponding bottom faces are tapered to present a sharp scraping edge and to assist in pushing the pit out of the device."

[*Official Gazette July 11, 1933.*]